March 19, 1968     A. J. CAROLAN ETAL     3,373,654

DISPLAY VIEWING APPARATUS

Filed Oct. 6, 1965     3 Sheets-Sheet 1

INVENTORS
ANN J. CAROLAN
BY WILLIAM J. CAROLAN

*Jack W. Edwards*

ATTORNEY

INVENTORS
ANN J. CAROLAN
WILLIAM J. CAROLAN
BY
*Jack W. Edwards*
ATTORNEY

United States Patent Office 3,373,654
Patented Mar. 19, 1968

3,373,654
DISPLAY VIEWING APPARATUS
Ann J. Carolan and William J. Carolan, Santa Cruz, Calif.
(both of 1642 Ontario Ave., Sunnyvale, Calif. 94087)
Filed Oct. 6, 1965, Ser. No. 493,475
1 Claim. (Cl. 88—24)

ABSTRACT OF THE DISCLOSURE

A pair of back screen projectors are housed within a cabinet and connected for synchronous operation so that slides can be shown in pairs. Controls are provided for regulating the period and sequence in which images are displayed.

---

This invention relates to a display viewing apparatus and more particularly to a device for showing photographic slides of sales displays in a programmed manner subject to regulation by customers.

There is a need for a device which will display objects that are difficult to bring into a showroom such as real estate, houses, building fixtures and materials. Architects and building designers have experienced difficulty with clients, who are unable to visualize the appearance of a structure from building plans. Developers and contractors find that people want to see what they are buying before entering into purchase agreements for future houses and building contracts. In the building industry, it is costly to maintain model homes for illustrating the types of houses that can be built for various prices by a builder. Furthermore, inspection of completed buildings for the purpose of obtaining ideas for future construction requires a considerable amount of time and travel.

An object of the present invention is to provide an improved display viewing apparatus for showing sales displays of articles which are difficult to bring into a showroom.

Another object of the invention is to show photographic slides of sales displays in a programmed manner giving general illustrations simultaneously with corresponding detailed information.

A further object of the invention is to provide controls for regulation by customer-viewers so that interesting displays can be retained on the screen and studied for an extended period and the sequence of showing slides can be reversed to review items of interest.

An additional object of the invention is to provide for direct communication means between customers at the display viewing apparatus and offices of display advertisers.

Other objects and advantages of the invention will be apparent from the following detailed description, in which.

Figure 1:
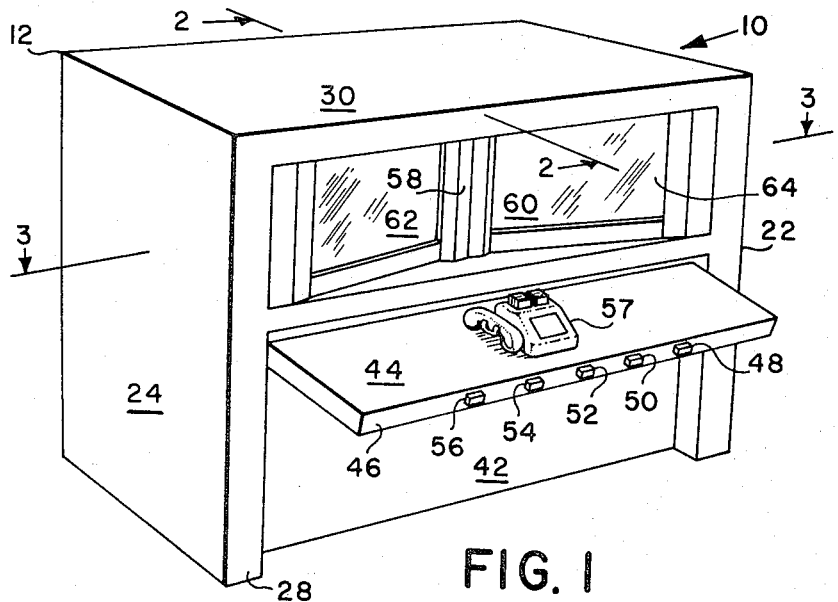
FIGURE 1 is a perspective view of a display viewing apparatus in which the present invention is embodied.

With reference to the drawings, a display viewer 10 is shown in FIG. 1 having a cabinet 12. The cabinet is supported by a pair of casters 14 (see FIG. 2), located at the front corners, and a pair of casters 16, located at the rear corners, which facilitate movement of the cabinet upon floor 18. The cabinet includes a bottom panel 20 which is mounted upon the casters and serves as a support member. Extending upwardly from the bottom panel are a right side panel 22, a left side panel 24, a rear panel 26 and a front panel 28. These upwardly extending panels support a top panel 30. A screened opening 32 is provided in the bottom panel to permit ventilation within the cabinet. A service opening 34 is located within the rear panel and is normally closed by a cover 36 having a screened ventilation opening 38 located therein. A frame 40 is fixed to the rear panel around the perimeter of the service opening for reinforcement thereof and to support the cover which is secured to the frame by removable fasteners such as screws, not shown in the drawing.

Figure 2:
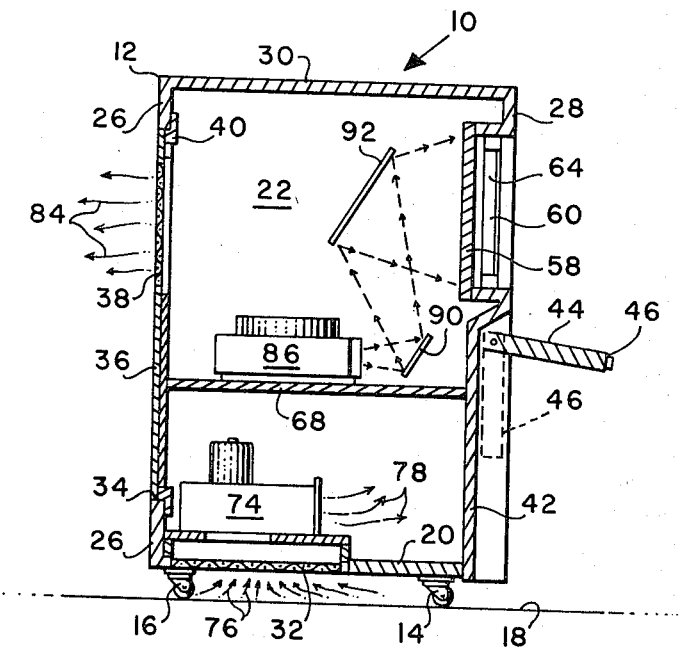
FIGURE 2 is a transverse section taken on the line 2—2 of FIG. 1.

The front panel 28 includes a recessed skirt portion 42, as shown in FIGS. 1 and 2. A shelf 44 is hingedly mounted to the front panel and is adapted to hang in apron-like fashion in front of the skirt panel, as indicated by the dotted lines in FIG. 2, or to be supported in the outwardly extending position, shown in solid lines in FIGS. 1 and 2. The shelf includes an outermost edge 46 upon which control switches 48, 50, 52, 54 and 56 are positioned. These control switches will be further described in conjunction with the electrical circuit. The shelf supports a telephone 57 which is of the automatic dialing type responsive to the insertion of punched cards for direct communication with the offices of display advertisers. The shelf is also utilized by customer-viewers when taking notes and for supporting materials. Above the shelf 44 is a face portion 58 recessed inwardly from the front panel 28. A pair of viewing screens 60 and 62 are positioned within the face portion and aligned in side by side relationship forming an obtuse central angle inwardly indented from the front panel. These viewing screens have front sides 64 and back sides 66, as shown in FIG. 3, and are adapted for viewing images from the front sides which are projected on the back sides thereof.

A projector support shelf 68 extends between the rear panel 26 and the recessed skirt portion 42. Ventilation openings 70 and 72 are provided within the shelf 68, as shown in FIG. 3. A blower fan unit 74, which may be of various well known makes, is positioned to rest upon the bottom panel 20, as shown in FIG. 2, located above the screen opening 32 and adapted to draw air from outside the cabinet and circulate it therein, following a pattern indicated by arrows 76 and 78. The blower fan unit may be omitted when projection equipment having an integral blower or cooling system is used. Air currents from the blower 74 circulate upwardly through the ventilation openings 70 and 72, as indicated in FIG. 3 by arrows 80 and 82. These air currents cool the projection equipment and then pass out the rear through the screened ventilation opening 38, as indicated by the arrow 84.

Figure 3:
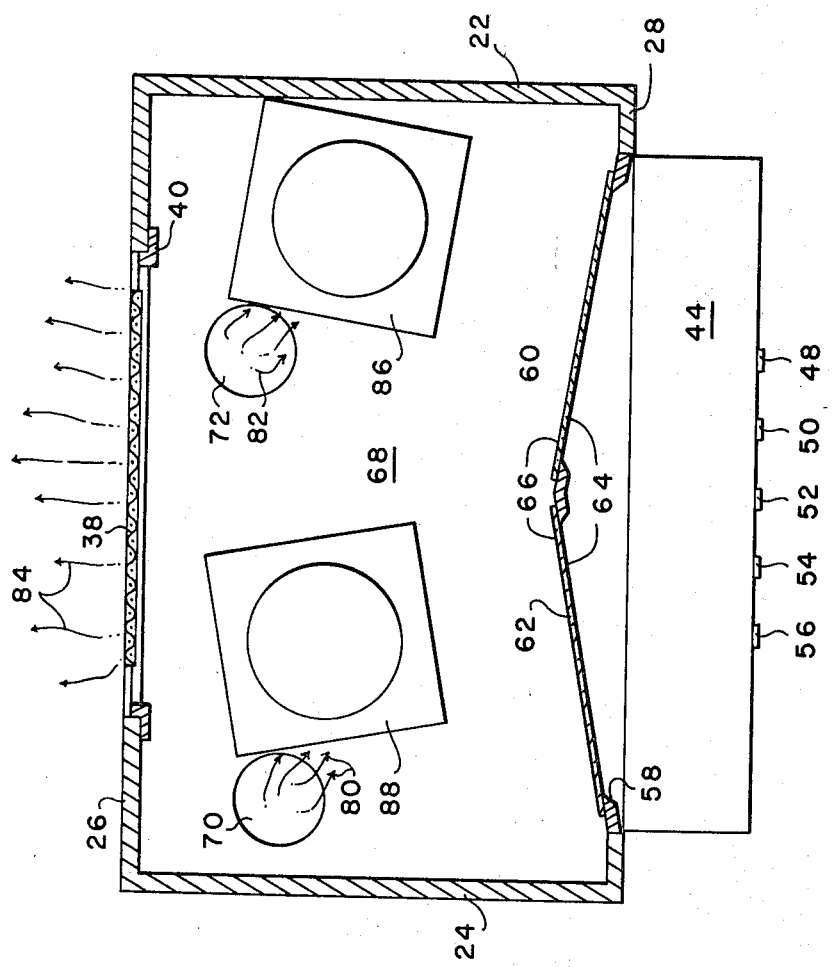
FIGURE 3 is a horizontal section taken on the line 3—3 of FIG. 1.

A pair of automatic slide projectors 86 and 88 are fixed in place on the support shelf 68, as shown in FIG. 3. These projector units may be of various well known makes and utilize either circular or linear type slide magazines. A pair of lower mirrors 90, one of which is shown in FIG. 2, are positioned in front of each projector unit and are inclined to reflect images projected thereon upwardly and rearwardly to corresponding upper mirrors 92, which are fixed above each projector unit. Images projected upon the upper mirrors 92 are reflected upon the back sides of the corresponding viewing screens 60 and 62. These images, when projected on the back sides of the viewing screens, are visible through the screens from the front side.

Figure 4:
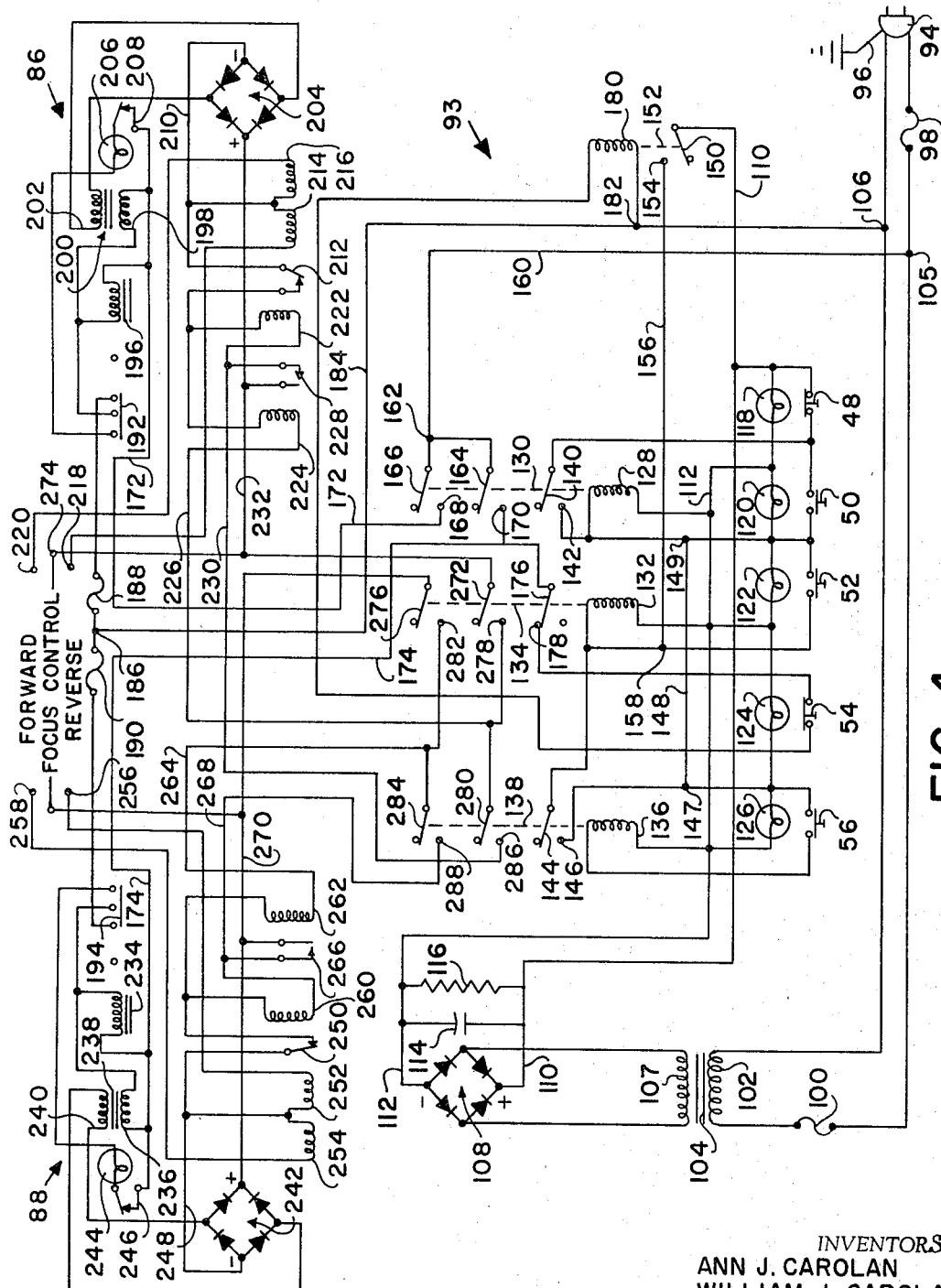
FIGURE 4 is a schematic view of an electrical control circuit linking a pair of slide projectors for simultaneous operation responsive to push button control.

The automatic slide projectors 86 and 88 are controlled by an electrical circuit 93, shown in FIG. 4. The slide projectors used herein are Airequipt Avventura models 380, but it will be understood that various types of slide projectors may be used with certain modifications of the electrical circuit. Looking at FIG. 4, the circuit 93 is coupled with a source of power furnishing 105–120 volts A.C. at 50/60 c.p.s. by a connector 94 having a ground 96. This connector is coupled in series with a 15 amp. fuse 98, a ½ amp. fuse 100 and a primary winding 102 of a step-down transformer 104, which supplies power for the control switches 48, 50, 52 and 56. A circuit branches off from the original circuit at points 105 and 106 and is connected in parallel with fuse 100 and primary winding 102. This circuit supplies power to the projectors and will be described later.

A secondary winding 107 of the step-down transformer 104 receives an alternating current having a voltage reduced to 28 volts. This secondary winding is coupled with A.C. poles of a contact rectifier 108, which is of the full-wave bridge type. A wire 110 is connected to the positive D.C. terminal of the rectifier, while wire 112 is connected to the negative D.C. terminal and there is a 24 volt potential between. A fixed capacitor 114 and a resistor 116 are connected in parallel between wires 110 and 112 together with a series of control lamps 118, 120, 122, 124 and 126. These control lamps illuminate the switches 48, 50, 52, 54 and 56, respectively.

Switches 48 and 50 control "OFF" and "ON" operation, respectively, and are connected in series with each other while being in parallel relationship with lamps 118 and 120. Coil 128 operates "ON" relay 130 and is connected between switches 50 and 52, lamps 120 and 122, and to wire 112. Switch 52 controls the "FORWARD" operation of the display viewer 10 and is connected in series with switches 48 and 50, together with coil 132 which operates the "FORWARD" relay 134. Switch 56 controls the "REVERSE" operation of the viewer and is coupled in parallel relationship with lamp 126 and in series with coil 136 which operates "REVERSE" relay 138. "HOLD" switch 54 is connected within the circuit branching off at points 105 and 106, which will be described later.

"ON" relay 130 has a contact 140 linked to the connection between switches 48 and 50. Upon movement of the relay, the contact will close a circuit with contact point 142 which is connected between coil 128 and switch 50. "REVERSE" relay 138 has a contact 144 which is connected between coil 132 and switch 52. Opposite contact 144 is a contact point 146 which is connected between lamp 126 and switch 56 and has a second connection point 147. A wire 148 extends between points 147 and 149 linking the connections of contact points 146 and 142. Wire 110 extends to a contact 150 which is operated by a time delay relay 152. This relay is adjustably set for a 12 second period. Opposite contact 150 is a contact point 154 connected by wire 156 to the connection between coil 132 and switch 52 at point 158.

The circuit which supplies power to the projectors 86 and 88 includes wire 160 extending between point 105 and point 162. "ON" relay 130 has a pair of contacts 164 and 166 which are connected to the wire 160 at point 162. A contact point 168 is connected to wire 172 while contact point 170 is connected to wire 174. Contact 176 of the forward relay 134 is also connected to wire 174. Opposite contact 176 is a contact point 178 which is linked in series with the "HOLD" switch 54 and a coil 180 of the time delay relay 152. Coil 180 is coupled at point 182 to a wire 184 which extends between point 106 and point 186. A pair of 6 amp. fuses 188 and 190 are located on opposite sides of point 186 and in turn are connected to switches 192 and 194, respectively. Switches 192 and 194 control the operation of projectors 86 and 88, respectively, but are maintained in the "ON" position shown when incorporated within the display viewer 10.

Within the projector 86 is a fan motor 196 connected between switch 192 and wire 172. In parallel with the fan motor is a primary winding 198 of a transformer 200. A secondary winding 202 of the transformer receives a 28 volt A.C. current therefrom and is connected with A.C. poles of a contact rectifier 204. A projection lamp 206 and a thermal switch 208 are connected in series between switch 192 and line 172. Wire 210 extends from the negative D.C. terminal of the contact rectifier and is connected to a slide lever switch 212. Focus solenoids 214 and 216 are respectively the reverse and forward solenoids and have a connection therebetween with wire 210. Opposite ends of the focus solenoids are connected to control points 218 and 220, respectively. Slide lever switch 212 is connected on the side opposite from wire 210 with a reverse solenoid 222 and a forward solenoid 224 which in turn are connected to wire 226. The reverse solenoid 222 is also connected to reverse switch 228 and wire 230. Wire 232 is connected to the reverse switch 228 and the positive D.C. terminal of contact rectifier 204.

Within projector 88 is a fan motor 234 connected between switch 194 and wire 174. In parallel with the fan motor is a primary winding 236 of a transformer 238. A secondary winding 240 of the transformer receives a 28 volt A.C. current therefrom and is connected with A.C. poles of a contact rectifier 242. A projection lamp 244 and a thermal switch 246 are connected in series between switch 194 and wire 174. Wire 248 extends from the negative D.C. terminal of the contact rectifier and is connected to a slide lever switch 250. Focus control solenoids 252 and 254 are reverse and forward solenoids, respectively, and have a connection therebetween with wire 248. At the outer end of solenoid 252, connection is made with reverse control point 256 while the outer end of solenoid 254 is connected to forward control point 258. Slide lever switch 250 is connected on the side opposite from wire 248 with a reverse solenoid 260 and a forward solenoid 262 which in turn are connected to wire 264. The reverse solenoid 260 is also connected with reverse switch 266 and wire 268. Wire 270 is connected to the reverse switch 266 and the positive D.C. terminal of contact rectifier 242.

Forward relay 134 has a contact 272 connected to wire 232 and focus control point 274. A contact 276 of relay 134 is connected to wire 270. Opposite contact 272 is a point 278 linked to wire 226 and contact 280 of reverse relay 138. Point 282 is positioned opposite contact 276 and is linked to wire 264 and contact 284 of relay 138. Point 286 is located opposite contact 280 and is connected to wire 230 while point 288 is located opposite contact 284 and is connected to wire 268.

In operation, the display viewer 10 is positioned within a showroom and the magazines of projectors 86 and 88 are loaded with photographic slides for presenting sales displays. The slides in one magazine will be of a general nature, such as an exterior view of a house, while the corresponding slide in the opposite magazine will be detailed information, such as a floor plan for the house together with a number referring to the display advertiser. Connector 94 is coupled with a source of electrical power and the control lamps 118, 120, 122, 124 and 126 illuminate the respective control switches 48, 50, 52, 54 and 56.

When control switches 48 and 50 are closed, coil 128 is energized to close relay 130. Thus, current passes through wires 172, 174 and 184 to energize the projectors 86 and 88. Time delay relay 152 is actuated by coil 180 every 12 seconds closing contact 150 on contact point 154. Current passes from wire 110 through wire 156 to point 158 and then through coil 132 to wire 112. When current passes through coil 132, relay 134 is closed so that contacts 272 and 276 engage points 278 and 282, respectively. Thus, current flows from wires 232 and 270 to wires 226 and 264, respectively, so that forewared solenoids 224 and 262 are energized together with slide lever switches 212 and 250. The slides are changed simultaneously in each projector to the next set. If it is desired to by-pass the time-delay relay and move forward immediately, this can be accomplished by pressing control switch 52 to form a circuit through switches 48, 50 and 52 from wire 110 to point 158 and thence through coil 132 to wire 112.

Should it be desired to hold slides on the viewing screens 60 and 62 beyond the 12 second interval, the "HOLD" control switch 54 is opened. Thus, the flow of current through coil 180 is eliminated and time delay relay 152 is inactive. To review slides, the "REVERSE"

control switch 56 is closed, energizing coil 136 and closing reverse relay 138. Current then passes through wires 230 and 268, actuating reverse switches 228 and 266, reverse solenoids 222 and 260, slide lever switches 212 and 250, reverse focus solenoids 214 and 252, and to reverse control points 218 and 256. By opening "OFF" control switch 48, the flow of current to coil 128 is broken, thus allowing relay 130 to open and break the connections with wires 172 and 174. This eliminates the flow of current to projectors 86 and 88, stopping their operation.

When the display viewer 10 is operating showing sets of slides every 12 seconds, a customer-viewer can scan the general slide and briefly view the detailed information to develop interest. When slides of interest are observed, they may be held on the screen by opening "HOLD" control switch 54. Slides can be reviewed by using "REVERSE" switch 56 and then return rapidly with "FORWARD" switch 52. When a cutsomer sees an item of interest on which further information is desired, a punch card, identified by a number corresponding to that of the display advertiser, is inserted into telephone 57 to automatically dial the number of the display advertisers office, providing direct communication therewith.

It will be understood that modifications and variations of the embodiments of the display viewing apparatus disclosed herein may be resorted to without departing from the spirit of the invention and the scope of the appended claim.

Having thus described our invention, what we claim as new and desire to protect by Letters Patent is:

1. A display viewer comprising:
   a pair of screens, each screen having a front and back side and being adapted for viewing from the front side images projected on the back side thereof,
   a pair of slide projectors for projecting images of photographic slides,
   a plurality of mirrors arranged to reflect images projected by said slide projectors onto the back sides of said screens,
   means connecting said projectors for synchronous operation,
   a cabinet housing said projectors and screens, the front sides of said screens being visible from outside said cabinet,
   a shelf member extending outwardly from said cabinet below said screens, and
   a control panel located along an edge of said shelf member farthest from said cabinet having switch means thereon for operating said projectors.

References Cited

UNITED STATES PATENTS

| | | | |
|---|---|---|---|
| 1,903,950 | 4/1933 | Weinberger | 352—36 |
| 1,942,748 | 1/1934 | De Ybarrondo | 352—6 |
| 2,660,616 | 11/1953 | Hammond et al. | 88—24 |
| 2,915,840 | 12/1959 | Wiklund | 88—28 |
| 3,030,855 | 4/1962 | Miller | 352—36 |
| 3,151,523 | 10/1964 | King | 88—28 |
| 3,159,841 | 12/1964 | Castedello et al. | 352—10 |
| 3,179,006 | 4/1964 | Clark | 88—28 |
| 3,228,132 | 1/1966 | Wiklund | 88—28 |
| 3,262,357 | 7/1966 | Warzynski et al. | 88—24 |

FOREIGN PATENTS

| | | |
|---|---|---|
| 1,202,022 | 9/1965 | Germany. |

NORTON ANSHER, *Primary Examiner.*

RICHARD M. SHEER, *Assistant Examiner.*